United States Patent
Chen

(10) Patent No.: US 9,794,768 B2
(45) Date of Patent: Oct. 17, 2017

(54) RE-ACTIVATING A FIRST ACCESS POINT NAME USING A SECOND ACCESS POINT NAME

(71) Applicant: General Motors LLC, Detroit, MI (US)

(72) Inventor: Bonnie Chen, Grapevine, TX (US)

(73) Assignee: General Motors LLC, Detroit, MI (US)

( * ) Notice: Subject to any disclaimer, the term of this patent is extended or adjusted under 35 U.S.C. 154(b) by 246 days.

(21) Appl. No.: 14/686,064

(22) Filed: Apr. 14, 2015

(65) Prior Publication Data

US 2016/0309538 A1    Oct. 20, 2016

(51) Int. Cl.
| | | |
|---|---|---|
| *H04W 8/02* | (2009.01) | |
| *H04W 24/04* | (2009.01) | |
| *H04W 8/18* | (2009.01) | |
| *H04W 88/16* | (2009.01) | |

(52) U.S. Cl.
CPC .............. *H04W 8/02* (2013.01); *H04W 24/04* (2013.01); *H04W 8/18* (2013.01); *H04W 88/16* (2013.01)

(58) Field of Classification Search
CPC .................................................... H04W 24/04
See application file for complete search history.

(56) References Cited

U.S. PATENT DOCUMENTS

| | | | | |
|---|---|---|---|---|
| 2003/0027554 | A1* | 2/2003 | Haumont | H04M 15/08 455/414.1 |
| 2010/0075658 | A1* | 3/2010 | Hou | H04W 48/02 455/422.1 |
| 2012/0324117 | A1* | 12/2012 | Chuang | H04W 48/17 709/227 |
| 2014/0119353 | A1* | 5/2014 | McCann | H04W 76/022 370/338 |
| 2014/0226641 | A1* | 8/2014 | Kim | H04W 4/005 370/338 |
| 2015/0049735 | A1* | 2/2015 | Choi-Grogan | H04W 36/0027 370/331 |
| 2016/0165529 | A1* | 6/2016 | Jin | H04W 48/12 370/338 |

* cited by examiner

*Primary Examiner* — Benjamin Lamont
(74) *Attorney, Agent, or Firm* — Christopher DeVries; Reising Ethington P.C.

(57) ABSTRACT

A communication system and methods of using the communication system to re-activate a previously used access point name (APN) in order to re-establish connectivity between an application service provider (ASP) and a telematics unit in a vehicle. The steps of the method include: receiving content data at the vehicle via the ASP using a first access point name (APN); experiencing a loss of connectivity between the vehicle and the ASP, wherein the loss of connectivity includes de-activation of the first APN with the ASP; transmitting from the vehicle via a second APN a re-activation request associated with the first APN; and in response to the re-activation request, receiving a notification at the vehicle that the first APN has been re-activated.

15 Claims, 3 Drawing Sheets

RE-ACTIVATING A FIRST ACCESS POINT NAME USING A SECOND ACCESS POINT NAME

TECHNICAL FIELD

The present invention relates to configuring a vehicle telematics unit to operate with a wireless carrier system, and more particularly, to configuring a vehicle to re-activate a previously-used access point name (APN).

BACKGROUND

Wireless carrier systems are used by provisioning entities to provide content data to mobile vehicles according to their subscription agreements (e.g., content data including use of the internet, the world wide web, e-mail data, various multimedia data, and even telematics services). The vehicle is identifiable (at least in part) by an access point name (APN); typically, telematics devices have a single APN which is used to communicate the content data to the vehicle. This APN may be associated with billing and usage data associated with a subscriber account. Sometimes the provisioning entity desires to terminate providing content data to the vehicle, which renders the APN inactive, at least with respect to the provisioning entity. Having terminated connectivity between the provisioning entity and the vehicle, the user sometimes will attempt to re-establish it. However, since the single APN is inactive, the vehicle will be unable to accomplish this task. Thus, the user is forced to use some other means to re-establish connectivity and re-activate the account (which sometimes includes replenishing the account with monies or credits, e.g., thereby renewing a user data plan). For example, the user may telephone the provisioning entity at a later time from a land line. However, this is an undesirable user experience and inhibits the user from receiving services from the provisioning entity while he/she is still in the vehicle. Thus, there is a need for a user to be able to re-establish connectivity and re-activate the account while still in the vehicle.

SUMMARY

According to an embodiment of the invention, there is provided a method of re-activating an access point name (APN) in order to re-establish connectivity between an application service provider (ASP) and a telematics unit in a vehicle. The method includes the steps of: receiving content data at the vehicle via the ASP using a first access point name (APN); experiencing a loss of connectivity between the vehicle and the ASP, wherein the loss of connectivity includes de-activation of the first APN with the ASP; transmitting from the vehicle via a second APN a re-activation request associated with the first APN; and in response to the re-activation request, receiving a notification at the vehicle that the first APN has been re-activated.

According to an embodiment of the invention, there is provided a method of re-establishing connectivity between an application service provider (ASP) and a telematics unit in a vehicle. The method includes the steps of: receiving content data at the vehicle via the ASP using a first access point name (APN); experiencing a loss of connectivity between the vehicle and the ASP, wherein the loss of connectivity includes de-activation of the first APN with the ASP; transmitting from the vehicle via a second APN a re-activation request associated with the first APN; in response to the re-activation request, receiving a notification at the vehicle that the first APN has been re-activated; sending a connection request to a wireless carrier system using the re-activated first APN; and following an acknowledgement of the connection request, re-establishing connectivity between the vehicle and the ASP using the re-activated first APN.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

A communication system is described below that enables a vehicle to connect with a wireless carrier system using two or more access point names (APNs). A private APN may be used with a backend system while a public APN may be used with a variety of provisioning entities or application service providers. By using the private APN with the backend system, vehicle security may be enhanced. This is particularly true when the vehicle is controllable remotely; e.g., when the vehicle may be remotely unlocked or started by the backend system using the private APN.

As discussed in detail below, sometimes the application service provider may de-activate a user account associated with the vehicle—in turn, this may de-activate the public APN, at least with respect to that particular application service provider. The system and methods discussed below describe how the private APN can be used to re-activate the public APN, thereby avoiding user frustration and improving the user's overall experience.

Communications System

Figure 1:
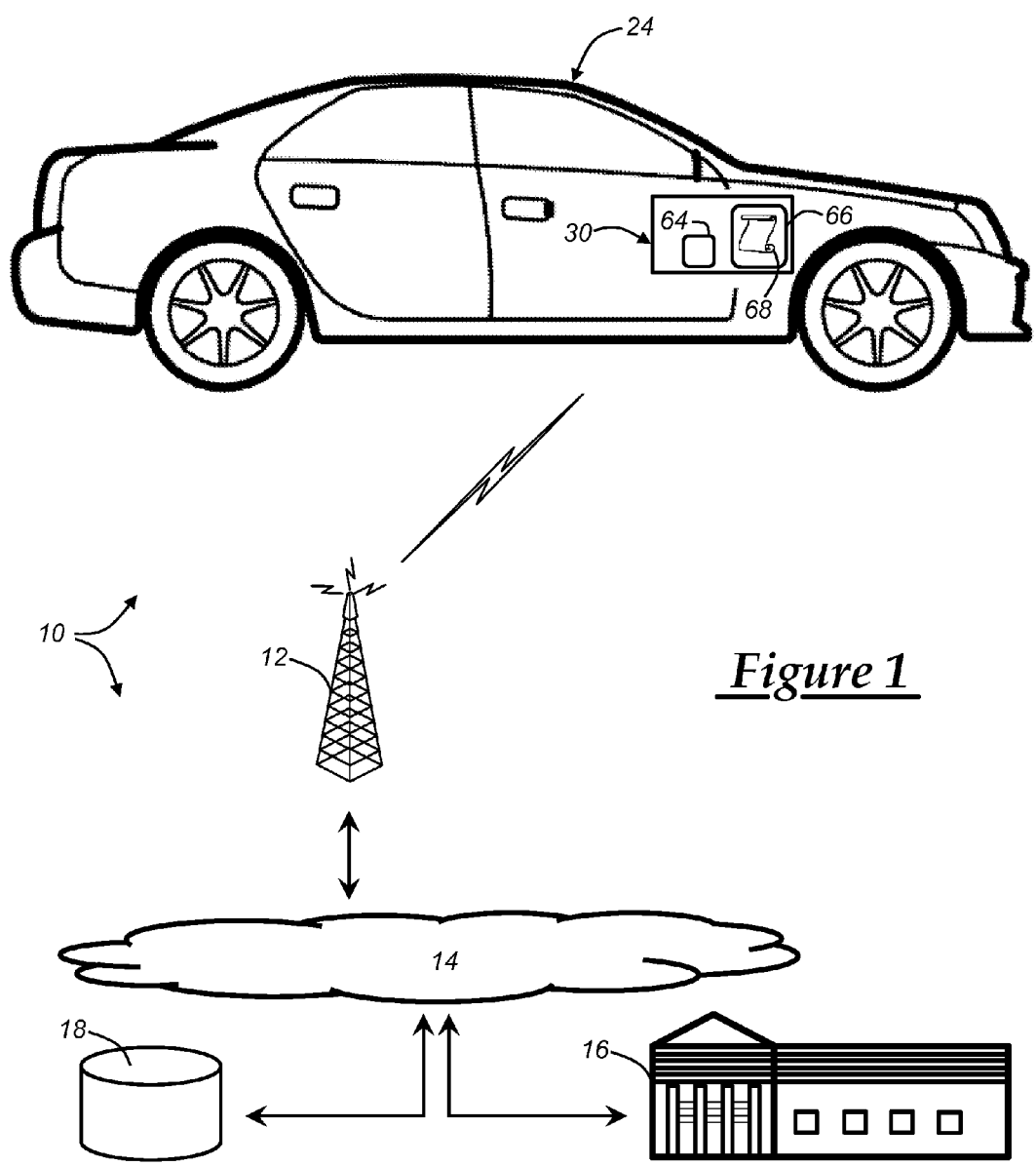
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a backend system 16; one or more provisioning entities or application service providers 18; and a vehicle 24 equipped with a telematics unit 30 and wirelessly coupled to the carrier system(s) 12. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

According to one embodiment, wireless carrier system (WCS) 12 is a cellular telephone system that includes a plurality of cell towers (only is one shown), one or more mobile switching centers (MSCs), one or more IP routers, one or more IP servers, one or more IP gateway, one or more applications servers (not shown), as well as any other networking components required to connect wireless carrier system 12 with land network 14. Each cell tower includes sending and receiving antennas and a base station, with the base stations from different cell towers being connected to the MSC or IP router either directly or via intermediary equipment such as a base station controller. Cellular system 12 can implement any suitable communications technology, including for example, analog technologies such as AMPS, or the newer digital technologies such as CDMA (e.g., CDMA2000) or GSM/GPRS/UMTS/LTE or future wireless technologies. As will be appreciated by those skilled in the art, various cell tower/base station/MSC/IP routers arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Other embodiments of wireless carrier system 12 also exist. For example, the wireless carrier system 12 could be a LTE system as well. Hence, an Evolved Node B (enodeB) can be used instead of a base transceiver station (BTS) [which is used in GSM networks]. A Serving Gateway (S-GW) [of an LTE system] may be used instead of a Serving GPRS Support Node (SGSN) [of the GSM system], a Packet Gateway or PDN Gateway (P-GW) [LTE] may be used instead of a Gateway GPRS Support Node (GGSN) [GSM], a Home Subscriber Server (HSS) [LTE] may be used instead of a Home Location Register (HLR) [GSM], etc. These are merely examples to illustrate that the wireless carrier system 12 may be of any suitable type, including systems now in use, as well as future systems which may be used or developed.

Figure 2:
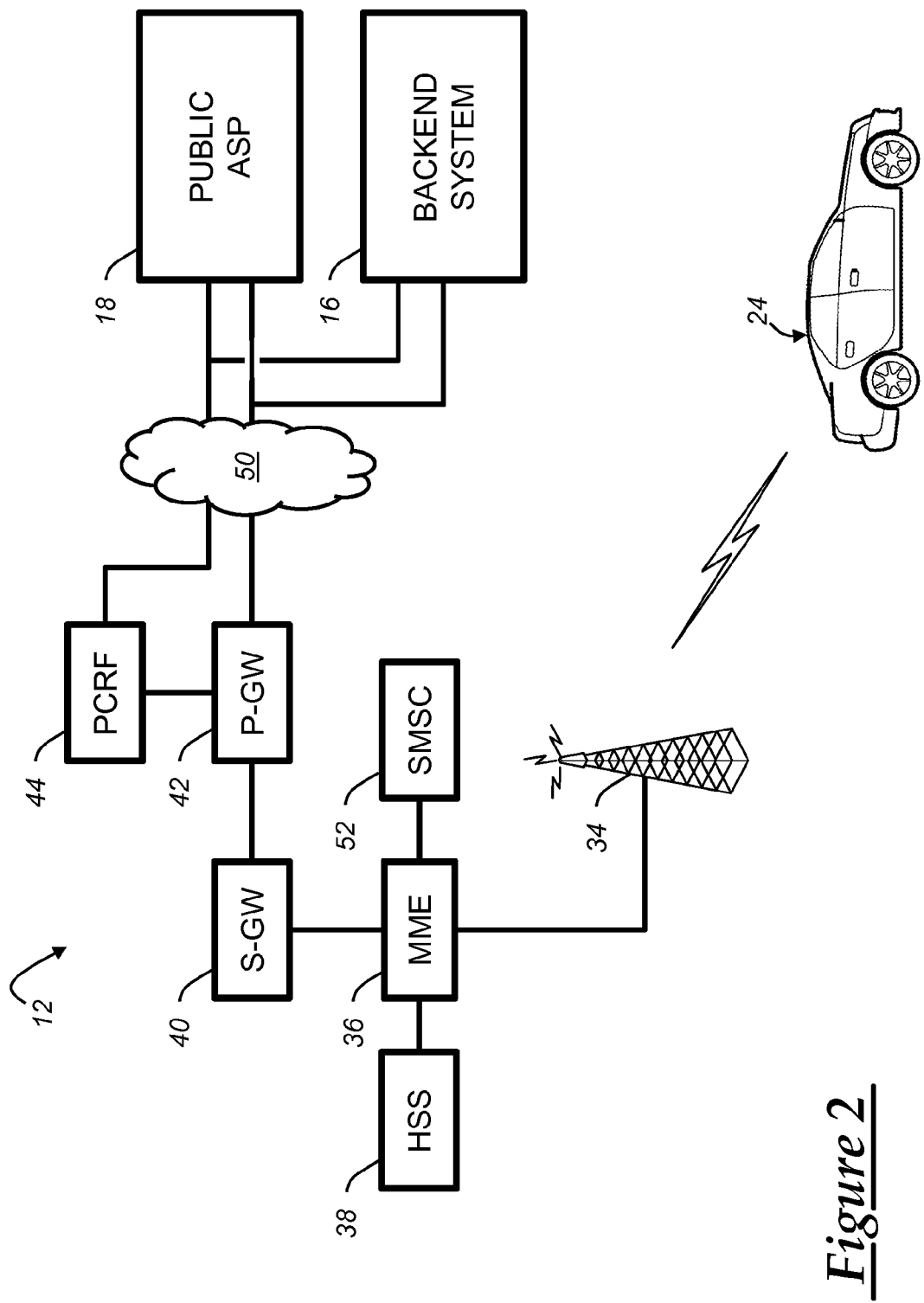
FIG. 2 is a schematic diagram illustrating a portion of the communications system of FIG. 1.

In FIG. 2, some components of an LTE wireless carrier system 12 are shown. For example, an enodeB 34 is shown in wireless communication with vehicle 24. The enodeB 34 is coupled to both an HSS 38 and a S-GW 40. The S-GW 40 is shown connected to a P-GW 42 which is also coupled to Policy & Charging Rules Function (PCRF) 44. Both P-GW 42 and PCRF 44 are coupled to the backend system 16 and ASP 18 via internet 50.

It should be appreciated that non-LTE components may interface to LTE wireless carrier systems, such as a Short Message Service Center (SMSC) 52 coupled to the MME 36. This also is merely an example; other non-LTE components may be connected or interact with the LTE system as well. Components of wireless carrier system 12 such as the enodeB 34, the MME 36, S-GW 40, the HSS 38, the P-GW 42, the PCRF 44, the internet 50, the SMSC 52, etc. are known to skilled artisans and will not be elaborated additionally here.

Returning to FIG. 1, apart from using wireless carrier system 12, a different wireless carrier system in the form of satellite communication can be used to provide uni-directional or bi-directional communication with the vehicle. This can be done using one or more communication satellites and an uplink transmitting station. Uni-directional communication can be, for example, satellite radio services, wherein programming content (news, music, etc.) is received by transmitting station, packaged for upload, and then sent to the satellite, which broadcasts the programming to subscribers. Bi-directional communication can be, for example, satellite telephony services using satellite to relay telephone communications between the vehicle 24 and uplink transmitting station. If used, this satellite telephony can be utilized either in addition to or in lieu of wireless carrier system 12.

Land network 14 may be a conventional land-based telecommunications network that is connected to one or more landline telephones and connects wireless carrier system 12 to backend system 16 and ASP(s) 18. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, backend system 16 and ASP(s) 18 need not be connected via land network 14, but could include wireless telephony equipment so that it can communicate directly with a wireless network, such as wireless carrier system 12.

Backend system 16 may include one or more computer servers and a data service center. Backend system 16 is designed to provide the vehicle 24 with a number of different system back-end functions (e.g., providing vehicle navigation services, vehicle concierge services, vehicle diagnostic, entertainment content data, and infotainment content data). In addition, backend system 16 generally includes one or more switches, servers, databases, live advisors, as well as an automated voice response system (VRS), all of which are known in the art. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, UMTS, LTE, and future wireless technologies and the like. Although one embodiment has been described as it would be used in conjunction with a manned data service center using a live advisor, it will be appreciated that the data service center of backend system 16 can instead utilize VRS as an automated advisor or, a combination of VRS and a live advisor can be used.

ASP 18 may be any suitable entity capable of providing content data to the vehicle 24 according to a subscriber or subscription agreement. The content data or internet content provided by ASP 18 broadly includes any textual, visual, or aural content transmitted over the World Wide Web, data conveyed using various communication means (e.g., e-mail, Internet telephony, SMS, video, multimedia, etc.), and data conveyed using various data transfer means (e.g., including file sharing, streaming media, etc.). Thus, internet content also includes: local and regional events and information, news and financial data, location data, social relation data, pop-culture information, sports and entertainment information, fitness data, on-line shopping data, just to name a few examples. One commercially available public ASP 18 is Pandora™ providing streaming music; another is Major League Baseball (MLB™) providing play-by-play of live Major Leagues games. These of course are merely examples; other examples exist.

ASP 18 may be available to the general public and may such receive payments from its subscribers, and provide promotional arrangements or offers to subscribers, just to name a few examples. ASP 18 also may account and log such payments or the absence thereof. As will be discussed in greater detail below, the ASP 18 may interact with the wireless carrier system 12—e.g., notifying the wireless carrier system 12 or a wireless service provider (e.g., using the WCS 12) when the subscriber needs to purchase a data plan, data credits, or the like. For example, ASP 18 may trigger a de-activation of a specific access point name or APN associated with vehicle 24 by communicating a message or command to the HSS 38 (or HLR in GSM systems) so that any attempt by vehicle 24 to receive content data using the specific APN will be denied (in other instances, the wireless carrier system or even the wireless service provider may trigger the de-activation).

ASP 18 may provide services using live personnel and/or computer interfaces (e.g., application software). ASP 18 can include one of a number of computers or servers accessible via a network such as the internet. Each such server can be used for one or more purposes, such as a web server accessible via land network 14 and/or wireless carrier 12.

Vehicle 24 is depicted in the illustrated embodiment as a passenger car, but it should be appreciated that any other vehicle including motorcycles, trucks, sports utility vehicles (SUVs), recreational vehicles (RVs), marine vessels, super carrier, train, aircraft, etc., can also be used. Vehicle 24 may include electronics such as a microphone, speakers, one or more pushbuttons or other control inputs, a vehicle head unit or entertainment unit, one or more visual displays, a number of vehicle system modules (VSMs) for controlling or regulating various vehicle subsystems, and the telematics unit 30 for carrying out vehicle communications as well as performing other vehicle functions. The head unit, VSMs, telematics unit, and other devices may be interconnected or electrically coupled by one or vehicle communication networks (e.g., by wired bus(es) or by one or more short range wireless communication (SRWC) networks).

Telematics unit 30 can be an OEM-installed (embedded) or aftermarket device that is installed in the vehicle and that enables wireless voice and/or data communication over wireless carrier system 12 and via wireless networking. This enables the vehicle 24 to communicate with backend system 16, ASP 18, other telematics-enabled vehicles (not shown), or some other entity or device. Telematics unit 30 preferably uses radio transmissions to establish a communications channel (a voice channel and/or a data channel) with wireless carrier system 12 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the backend system 16) and data communication (e.g., to provide GPS location data or vehicle diagnostic data to the backend system 16), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, UMTS, or LTE standards or IEEE 802.11x standards and thus includes a standard cellular and/or IEEE 802.11x chipset for voice communications like hands-free calling, a wireless modem (not shown) for data transmission, an electronic processing device or processor 64, one or more digital memory devices 66, and a dual antenna (not shown). It should be appreciated that the modem can either be implemented through software 68 (stored on memory 66) and is executed by processor 64, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit 30 can be configured with a static IP address or can set up to automatically receive an assigned IP address from another device on the network such as a router or from a network address server.

Processor 64 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 64 executes various types of digitally-stored instructions, such as software or firmware programs 68, which enable telematics unit 30 to provide a wide variety of services. For instance, processor 64 can execute programs or process data to carry out at least a part of the method discussed herein.

The memory 66 may include computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one embodiment, memory 66 is a non-transitory computer readable medium.

Telematics unit 30 can be used to provide a diverse range of vehicle services that involve wireless communication to and/or from vehicle 24. Such services include: turn-by-turn directions and other navigation-related services that are provided in conjunction with the GPS-based vehicle navigation module; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions 68 saved internal or external to telematics unit 30, they could be hardware components located internal or external to telematics unit 30, or they could be integrated and/or shared with each other or with other systems located throughout vehicle 24, to cite but a few possibilities. In the event that the modules are implemented as VSMs located external to telematics unit 30, they could utilize a vehicle data bus to exchange data and commands with the telematics unit.

In at least one embodiment, ASP 18 is an entity accessible by vehicle 24 and any other telematics-equipped vehicle that is configured to receive data over a data connection, whereas backend system 16 is a private entity accessible to vehicles having specially-configured telematics units. For example, a specially-configured telematics unit may be one that is configured with a public access point name (APN) and a private APN. It will be appreciated that communication devices (e.g., user equipment or UE) are configured generally with a single access point name (APN). However, in this specially-configured implementation, the telematics unit 30 may enable connection with backend system 16 via the private APN, whereas telematics unit 30 may enable connection to other entities or devices (such as ASP 18) using the public APN. By using the private APN, vehicle communication security may be increased since opportunities for malicious attack are decreased when the private APN is not used in venues or via communication paths likely to be accessible to such attackers (or hackers). It should be appreciated that the wireless carrier system 12 may be indifferent to which APN is used.

The identities of the public APN and the private APN may differ. For example, the private APN of telematics unit 30 may be designated 'backend APN' while the public APN may be designated 'consumer_APN.' These of course are merely examples; other implementations are possible.

Method

Figure 3:
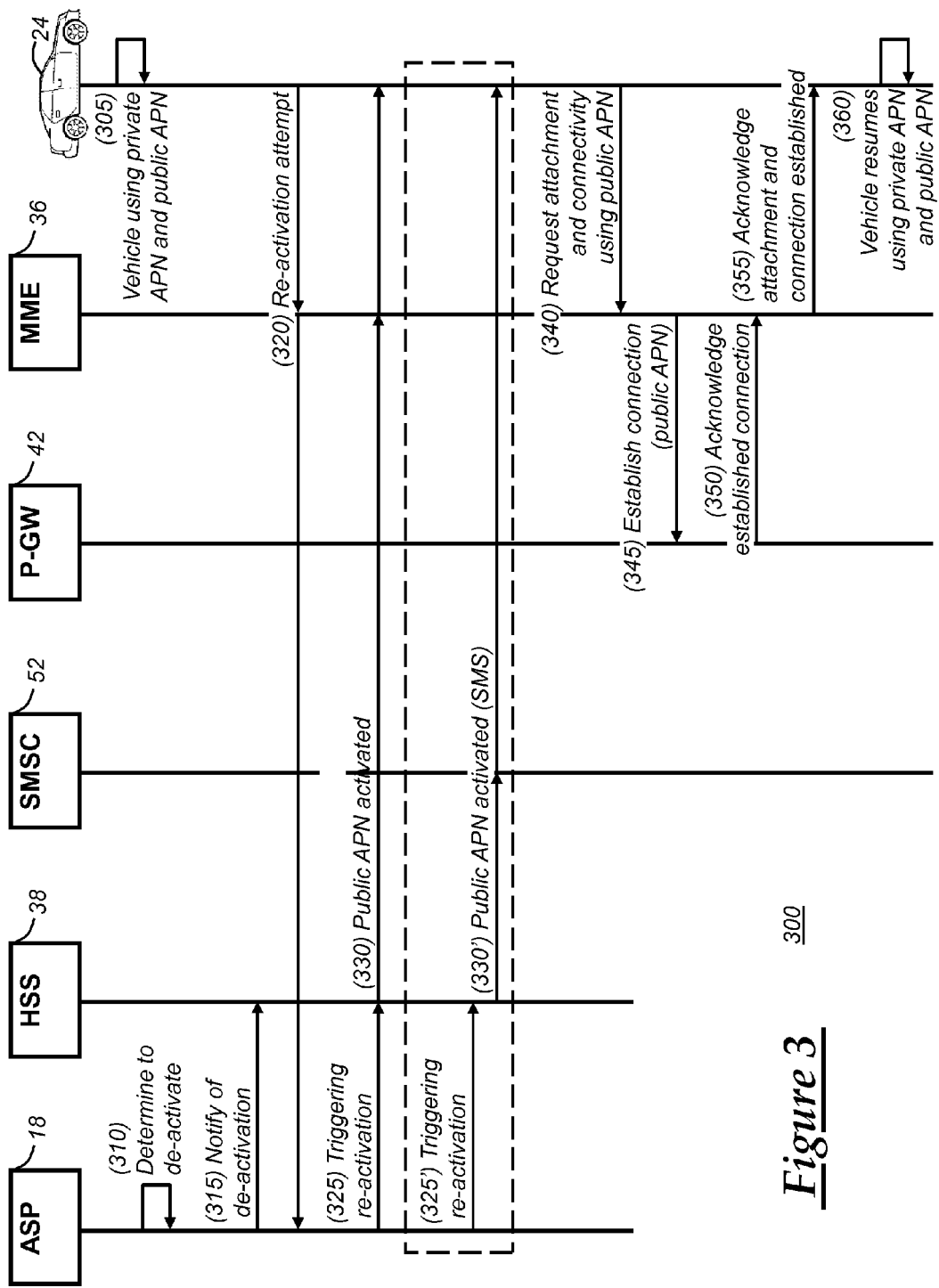
FIG. 3 is a flow diagram illustrating a method of using the communications system shown in FIGS. 2 and 3.

Turning now to FIG. 3, there is shown a method 300 of vehicle 24 interaction with the LTE communication architecture shown in FIGS. 1 and 2. And while the method is described with respect to an LTE wireless carrier system 12, it will be appreciated that the vehicle 24 may similarly interact with WCDMA, GSM, or any other suitable architectures. The vehicle telematics unit 30 in method 300 is configured with both a public APN (e.g., 'consumer_APN') and a private APN (e.g., 'backend_APN').

The method begins with step 305 in which vehicle 24 via the telematics unit 30 receives content data from ASP 18 using the public APN. A user of vehicle 24 may have a subscriber relationship (and account) with ASP 18, and in the subscriber relationship, the user may be expected to provide valuable consideration such as credits or monies in exchange for the ASP 18 providing the content data—e.g., such as a predetermined amount of data (e.g., in Gigabytes or Gb) or for a predetermined period of time (e.g., per month, per year, etc.). In step 305, vehicle (and/or telematics unit 30) may use be using or at least capable of using the private APN with the backend system 16. Following step 305, the method proceeds to step 310.

In step 310, the ASP 18 determines a de-activation of the subscriber account. Determining to de-activate the subscriber account results in the account becoming inactive and the ASP discontinuing the providing of content data to vehicle 24. This may occur for any suitable reason; e.g., in at least one implementation, it may be due to a depletion or otherwise absence of consideration (e.g., the credits or monies have been consumed and more credits or monies are now due). This of course is merely an example; the de-activation may be attributable to any other suitable reason.

When the de-activation is determined, the ASP 18 may notify the wireless carrier system 12 (e.g., the HSS 38) that the vehicle 24 may not receive content data or other services from ASP 18 via the public APN [step 315]. This may include wireless carrier system 12 updating the user's subscriber account, or even deleting, overwriting, or otherwise removing at least a portion of the subscriber data associated with the account (e.g., which may be stored at HSS 38). This may result in the subscriber account and the public APN being considered 'inactive,' at least with respect to ASP 18. Thus, it will be appreciated that the public APN might be used with other ASPs (not shown) but not with ASP 18.

Later, following step 315 (or as a result thereof), the user of vehicle 24 may attempt to re-activate the account [step 320]. This may include the user replenishing the monies or credits to the subscriber account. According to one embodiment, the user may communicate with ASP 18 directly or indirectly using the private APN. For example, vehicle 24 may re-activate the subscriber account with ASP 18 by sending a message to re-activate and/or provide monies (or credits) to the backend system 16 using the private APN, which in turn may provide the message and/or monies to the ASP 18. In this embodiment, the private APN is used solely with the backend system 16 in order to maintain security; e.g., by reducing the exposure of the private APN to malicious attackers, as discussed above.

In another embodiment, vehicle 24 may re-activate the subscriber account by sending a message via the private APN to re-activate and/or provide monies (or credits) to ASP 18 without using the backend system 16. Here, use of the private APN with the ASP 18 may be limited to one or more predefined circumstances, such as this one.

It should be appreciated that without a second APN (e.g., the private APN), the vehicle 24 would not be able to so easily re-activate the subscriber account. For example, in vehicles having a single APN, when the single APN was de-activated, no further communication with ASP 18 could occur via the telematics unit 30 until, e.g., monies or credits are provided to replenish the subscriber account. And replenishment of the subscriber's account would not be possible via the telematics unit 30 as long as the single APN was de-activated (with respect to ASP 18). Thus, use of the private APN improves the overall user experience in vehicle 24 (e.g., by minimizing user frustration that accompanies re-activation in vehicles having a single APN). Following step 320, the method proceeds to step 325.

In step 325, the ASP 18 triggers a re-activation of connectivity between it and the vehicle 24. This may include the ASP 18 providing a subscriber account data update associated with the public APN to the wireless carrier system 12 (e.g., by sending a message that updates the HSS 38). The update includes an indication that the public APN may be used again with ASP 18; thus, vehicle 24 will again have permission to receive content data from ASP 18.

In response to the trigger in step 325, HSS 38 may send a notification to the vehicle 24 (via MME 36) [step 330]. This notification may indicate that the public APN is 'active,' at least with respect to ASP 18. Following step 330, the method may proceed to step 340.

Steps 340-355 generally are known to skilled artisans. Here, the vehicle 24 interacts with the wireless carrier system 12 in order to re-establish connectivity. For example, in step 340, vehicle 24 may communicate with MME 36 requesting attachment and connection using the public APN. In step 345, MME 36 communicates with P-GW 42 seeking to establish the connection using the public APN, and in step 350, P-GW 42 acknowledges the established connection to MME 36. Then, in step 355, MME 36 acknowledges the attachment and connection to vehicle 24.

In step 360, the vehicle 24 may resume using the public APN—e.g., may resume receiving content data from ASP 18. Step 360 may be similar to that described in step 305, wherein vehicle 24 can use both the public and private APNs.

Thus, method 300 may enable vehicle 24 to re-establish connectivity with ASP 18 without requiring significant, or perhaps any user interaction, thereby improving the user experience. The method may be accomplished by vehicle 24 using a second APN (e.g., the private APN) to re-activate a first APN (e.g., the public APN). In performing the method, use of the private APN may be limited. For example, the private APN can be used solely with the backend system 16; or for example, the private APN can be used in a re-activation step, but otherwise limited.

Other embodiments of method 300 also exist. For example, FIG. 3 illustrates steps 325' and 330' which may be executed in lieu of (or even in addition to) steps 325 and 330, respectively. In step 325', ASP 18 may trigger the same re-activation; however, it may be a short message service (SMS) communication or it may be a command to the HSS 38 that communications with vehicle 24 should be SMS. This may be received by HSS 38, and in step 330', HSS 38 may communicate to vehicle 24 that the public APN has been activated—again via SMS (e.g., active at least with respect to ASP 18). Other aspects of step 325' and 330' may be similar to steps 325 and 330 and will not be re-discussed here.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of re-activating an access point name (APN) in order to re-establish connectivity between an application service provider and a telematics unit in a vehicle, comprising the steps of:
    receiving content data at the vehicle via the application service provider (ASP) using a first access point name (APN);
    receiving vehicle services data at the vehicle from a backend system using a second access point name (APN), wherein the second APN is a private APN, wherein the vehicle services data pertains to one or more vehicle services, and wherein the first APN and the second APN are concurrently activated;
    experiencing a loss of connectivity between the vehicle and the ASP, wherein the loss of connectivity includes de-activation of the first APN with the ASP;
    transmitting from the vehicle to the backend system via the second APN a re-activation request associated with the first APN, wherein the backend system is configured to:
        carry out one or more backend vehicle services for a plurality of vehicles, which includes transmitting vehicle services to the plurality of vehicles, and wherein the plurality of vehicles includes the vehicle;
        receive the re-activation request associated with the first APN from the vehicle via the second APN; and
        in response to receiving; the re-activation request associated with the first APN, send a re-activation message to the ASP, wherein the ASP is configured to trigger a re-activation of connectivity with the vehicle, wherein the triggering of the re-activation of connectivity includes sending a subscriber account data update associated with the first APN to a subscriber-authorization server, and wherein the receipt of the subscriber account data update at the subscriber-authorization server causes the first APN to be re-activated such that both the first APN and the second APN are concurrently activated; and
    in response to the re-activation request, receiving a notification at the vehicle that the first APN has been re-activated.

2. The method of claim 1, wherein the loss of connectivity is associated with a determination at the ASP to de-activate a subscriber account.

3. The method of claim 1, wherein the loss of connectivity is attributable to a deletion of at least a portion of subscriber account data at the subscription-authorization server, wherein the subscription-authorization server is either a home subscriber server (HSS) or at a home location register (HLR) in the wireless carrier system.

4. The method of claim 1, wherein the re-activation request is associated with credits or monies to replenish a subscriber account with the ASP.

5. The method of claim 1, wherein the second APN is used exclusively with the backend system.

6. The method of claim 1, wherein the notification is received from at least one of: a home subscriber server (HSS) in the wireless carrier system, a home location register (HLR) in the wireless carrier system, or a short message service center (SMSC) in the wireless carrier system.

7. The method of claim 1, further comprising:
    sending a connection request to a wireless carrier system using the re-activated first APN; and
    following an acknowledgement of the connection request, re-establishing connectivity between the vehicle and the ASP using the re-activated first APN.

8. A method of re-establishing connectivity between an application service provider and a telematics unit in a vehicle, comprising the steps of:
    receiving content data at the vehicle via the application service provider (ASP) using a first access point name (APN);

receiving vehicle services data at the vehicle from a backend system using a second access point name (APN), wherein the vehicle services data pertains to one or more vehicle services, and wherein the first APN and the second APN are concurrently activated;

experiencing a loss of connectivity between the vehicle and the ASP, wherein the loss of connectivity includes de-activation of the first APN with the ASP;

transmitting from the vehicle to the ASP via the second APN a re-activation request associated with the first APN, wherein the ASP is configured to trigger a re-activation of connectivity with the vehicle, wherein the triggering of the re-activation of connectivity includes sending a subscriber account data update associated with the first APN to a subscriber-authorization server, and wherein the receipt of the subscriber account data update at the subscriber-authorization server causes the first APN to be re-activated such that both the first APN and the second APN are concurrently activated;

in response to the re-activation request, receiving a notification at the vehicle that the first APN has been re-activated;

sending a connection request to a wireless carrier system using the re-activated first APN; and following an acknowledgement of the connection request, re-establishing connectivity between the vehicle and the ASP using the re-activated first APN.

9. The method of claim 8, wherein the loss of connectivity is associated with a determination at the ASP to de-activate a subscriber account.

10. The method of claim 8, Wherein the loss of connectivity is attributable to a deletion of at least a portion of subscriber account data at the subscription-authorization server, wherein the subscription-authorization server is either a home subscriber server (HSS) or at a home location register (HLR) in the wireless carrier system.

11. The method of claim 8, wherein the re-activation request is transmitted to a backend system associated with the vehicle, which in turn provides an indication of the re-activation request to the ASP.

12. The method of claim 11, wherein re-activation request is associated with credits or monies to replenish a subscriber account with the ASP.

13. The method of claim 11, wherein the second APN is used exclusively with the backend system.

14. The method of claim 8, wherein the notification is received from at least one of: a home subscriber server (HSS) in the wireless carrier system, a home location register (HLR) in the wireless carrier system, or a short message service center (SMSC) in the wireless carrier system.

15. The method of claim 8, wherein the first APN is a public APN and the second APN is a private APN.

* * * * *